Patented Feb. 6, 1951

2,540,636

UNITED STATES PATENT OFFICE 2,540,636

SEPARATION OF NITRILE INTERMEDIATES IN AMIDONE SYNTHESIS

Roger W. Stoughton, St. Louis, Mo., assignor to Mallinckrodt Chemical Works, St. Louis, Mo., a corporation of Missouri No Drawing. Application November 12, 1947, Serial No. 785,531

13 Claims. (Cl. 260—465)

This invention relates to the separation of nitriles and more particularly to the separation of isomeric nitrile compositions.

This application is a continuation-in-part of my copending application, Serial No. 747,331, filed May 10, 1947.

Among the objects of this invention are the provision of methods for separating isomeric mixtures of diphenyl amino nitriles; the provision of methods for separating isomeric mixtures of such nitriles which are contaminated with a relatively large proportion of contaminants; the provision of methods for effecting such separation which provide relatively complete separation of the components in an economical manner; and the provision of intermediate products through which the processes of the present invention may be practised. Other objects will be in part apparent and in part pointed out hereinafter.

The invention accordingly comprises the ingredients and combinations of ingredients, the proportions thereof, steps and sequence of steps and features of composition and synthesis, analysis, or metathesis, which will be exemplified in the products and processes hereinafter described, and the scope of the application of which will be indicated in the following claims.

In the manufacture of the analgesic drug, amidone, the aminonitrile, gamma-dimethylamino-alpha, alpha-diphenyl-valeronitrile, is a useful intermediate. However, as shown in my co-pending application referred to above, when this nitrile is formed by the condensation of dimethylaminopropyl chloride with diphenyl-acetonitrile, another isomeric aminonitrile is simultaneously formed. The other isomer is gamma-dimethylamino - alpha, alpha - diphenyl - beta-methylbutyronitrile. For convenience, the valeronitrile will be referred to hereinafter as the aminonitrile and the butyronitrile as the isoaminonitrile.

The separation of these isomers has been important in carrying out the most advantageous method of making amidone, but the importance of effecting this separation has become even greater with the discovery that the isoamidone, which can be made from the isoaminonitrile, differs in therapeutic action and activity from amidone and is, for some purposes, of great value. Thus, separation of the aminonitriles is no longer merely an onerous necessity but has become highly desirable.

It has now been found in accordance with the present invention that the aminonitrile may be separated from the isoaminonitrile by methods which are economical and practical. Moreover, the aminonitrile and the isoaminonitrile may be separately obtained from mixtures which also contain tarry contaminants, which are frequent by-products of the condensation of the dimethylaminopropyl chloride with diphenylacetonitrile.

I have discovered that the aminonitrile and the isoaminonitrile differ surprisingly in their solubilities in certain solvents, and I have also found an unexpected reversal in the solubilities of certain of their salts. By utilizing only the differences in the solubilities of the aminonitriles themselves, it is possible to obtain one of them, i. e., the least soluble, in a fairly pure state; but this procedure yields a pure aminonitrile and a residue which is still a mixture of the original aminonitriles, and therefore does not provide the practically quantitative separation of the aminonitrile mixture into the pure individual aminonitriles which their individual utility makes so desirable.

Clean separations can be obtained, however, by procedures based on my discovery that although the aminonitrile is less soluble than the isoaminonitrile in some solvents, the reverse is true of certain of their salts, the isoaminonitrile salt being less soluble than the aminonitrile salt. Thus, the separation of the aminonitrile and the isoaminonitrile from mixtures may be carried out by dissolving the mixture in a suitable solvent and allowing the aminonitrile to separate by crystallization, and then converting the residue from that crystallization to a salt such as the oxalate; and by crystallization from the appropriate solvent, the oxalate of the isoaminonitrile crystallizes and may be separated. Any residues from the crystallization of the oxalates may be subsequently processed by reconverting to a mixture of aminonitriles and repeating the process of separation in accordance with the present invention to obtain further quantities of the aminonitrile and the oxalate of the isoaminonitrile.

I have also found that the tarry contaminants are less soluble in acids than are the aminonitriles, so that when the mixture being treated contains tars, it is advantageous to extract the mixture with an acid to dissolve out the aminonitriles leaving a large proportion of the tars behind. The acid salts thereby obtained may then be extracted with a suitable solvent to dissolve out further portions of tar and the aminonitrile mixture recovered by neutralization with an alkali.

For the separation of the aminonitrile by crystallization from the mixture containing it and the isoaminonitrile, organic solvents are employed. Typical of these are the lower alcohols, such as methyl, ethyl, isopropyl, etc., and petroleum ether, although other organic solvents may be employed if desired. For the solvent used in crystallizing the oxalate of the isoaminonitrile from mixtures containing it, one of the alcohols such as methyl, ethyl, isopropyl, etc., or water may be used.

The following examples illustrate the invention:

Example 1

A crude mixture of isomeric aminonitriles was prepared by the reaction of dimethylaminochloropropane with diphenylacetonitrile. To 430 grams of this crude product 500 ml. of 91% isopropyl alcohol were added. The mixture was warmed until solution was complete and allowed to cool and crystallize. The crystal crop which separated was collected and amounted to 172 grams. This product was aminonitrile. This material melted at 88–89° C. and after recrystallization from 2 parts of isopropyl alcohol gave pure aminonitrile with a melting point of 91–92° C. To the mother liquors from the original crystallization, 117 grams of oxalic acid crystals (one equivalent) were added. The mixture was warmed until solution was complete and allowed to stand at room temperature. After standing for twenty-four hours, the crystal crop was collected and amounted to 217 grams of material which had a melting point of 169–171° C. This was crude isoaminonitrile binoxalate. On recrystallization from three parts of water a yield of 206 grams of essentially pure material was obtained. Pure isoaminonitrile binoxalate melts at 179–180° C. The isopropyl alcohol mother liquors from the crystallization of the binoxalates were distilled until the isopropyl alcohol had been completely removed. The residue was then dissolved in water and the resulting solution neutralized with sodium hydroxide. The brown oil which separated was washed with water by decantation and dried by heating on a steam bath. The yield was 82 grams. This was dissolved in 80 ml. of 91% isopropyl alcohol and allowed to crystallize. A yield of 25 grams of essentially pure aminonitrile was obtained. The isopropyl alcohol mother liquors from this last crystallization were reprocessed using the methods described above, and an additional amount of material was obtained.

Example 2

A suspension of 278 grams of residues, which had been obtained by distilling off the isopropyl alcohol from the mother liquors from the crystallization of the aminonitrile, in 2750 ml. of water was prepared and to it were added 60 ml. (0.6 equivalent) of concentrated hydrochloric acid. The mixture was stirred for four hours. The greater part of the oil dissolved to give a clear red solution. After standing overnight the water layer was separated by decantation leaving 89 grams of tarry residue. The water layer was neutralized with sodium hydroxide and the resulting oil washed by decantation with water. This oil was suspended in 650 ml. of water, and 90 grams of oxalic acid crystals were added. The mixture was warmed to complete solution and then allowed to crystallize. A yield of 104 grams of crude isoaminonitrile binoxalate was obtained. The mother liquors from this crystallization were neutralized with sodium hydroxide and the resulting oil was washed by decantation with water. It was finally recrystallized from one part of isopropyl alcohol and gave 32 grams of aminonitrile.

Example 3

A mixture of isomeric aminonitriles was prepared by the reaction dimethylaminochloropropane with diphenyl acetonitrile. The crude product was obtained by extraction of the reaction mixture with hydrochloric acid and neutralization of the acid extracts with sodium hydroxide. To 120 grams of this crude mixture of aminonitriles 100 ml. of absolute methanol were added. The mixture was warmed until solution was complete and allowed to cool and crystallize. The crystal crop which separated was collected and amounted to 43 grams. This product was aminonitrile and melted at 88–90° C. After recrystallization from two parts of methyl alcohol, 37 grams of pure aminonitrile with a melting point of 91–92° C. was obtained. The methanol mother liquors were combined and the methanol removed by distillation. The residue was then processed as in Example 2.

Example 4

A mixture of isomeric aminonitriles was prepared by the reaction of dimethylaminochloropropane with diphenyl acetonitrile. The crude product was obtained by extraction of the reaction mixture with hydrochloric acid and neutralization of the acid extracts with sodium hydroxide. To 39 grams of this crude mixture of aminonitrile, 200 ml. of petroleum ether were added. The mixture was warmed until solution was complete and allowed to cool and crystallize. The crystal crop which separated was collected and amounted to 21 grams. This product was aminonitrile and melted at 88–91° C. On recrystallization from petroleum ether 18.5 grams of pure aminonitrile melting at 91–92° C. was obtained. The petroleum ether mother liquors were combined and the petroleum ether removed by distillation. The residue was then processed as in Example 2.

Example 5

A mixture of 5 grams of aminonitrile, 3 grams of oxalic acid crystals, and 10 ml. of alcohol was warmed until a clear solution was obtained. This solution was allowed to evaporate at room temperature. After standing for several days, the oily residue crystallized. These crystals were recrystallized from 50 ml. of acetone. This gave pure gamma - dimethylamino - alpha,alpha-diphenyl-valeronitrile binoxalate with a melting point of 124 to 126° C. It is very soluble in lower alcohols and water but only moderately soluble in acetone.

Example 6

To 463 grams of the crude mixture of isomeric nitriles, prepared from the reaction of dimethylaminochloropropane and diphenylacetonitrile, 550 ml. of 91% isopropyl alcohol were added. The mixture was warmed until solution was complete and allowed to cool and crystallize. The crystal crop which separated was collected and amounted to 185 grams. This was aminonitrile. The mother liquors were distilled until all the isopropyl alcohol had been removed. The residue was suspended in two liters of hot water and 112 ml. of 10% sulfuric acid added. After stirring for one hour, the mixture was allowed to stand and the aqueous layer removed by decantation. The residual oil was treated with another two-liter portion of water and 112 ml. of 10% sulfuric acid. These extractions were continued until the extract tested acid to congo red. Four such extractions were necessary. A residue of 52 grams of brown-black tar remained. The combined acid extracts were then neutralized with sodium hydroxide solution and the light brown oil, which separated, was washed with water by decantation. This oil was suspended in one liter of water and 85 grams of oxalic acid crystals were added. The mixture was warmed to complete solution and then allowed to crystallize. A yield of 89 grams of crude isoaminonitrile binoxalate was obtained. The mother liquors from this crystallization were neutralized with sodium hydroxide and the resulting oil was washed by decantation with water. After drying on a steam bath this oil was dissolved in one part of warm isopropyl alcohol and allowed to crystallize. A yield of 41 grams of crude aminonitrile was obtained. The isopropyl mother liquors from this last crystallization were reprocessed using the methods described above and an additional amount of material was obtained.

Attention is directed to my copending application Serial No. 747,331, filed May 10, 1947.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

I claim:

1. The method of separating gamma-dimethyl-amino-alpha,alpha-diphenyl-valeronitrile from a mixture containing it and gamma-dimethyl-amino-alpha,alpha-diphenyl-beta - methylbutyronitrile which comprises dissolving the mixture in an organic solvent selected from the group consisting of aliphatic alcohols, saturated aliphatic hydrocarbons and aliphatic ketones, and crystallizing out the gamma-dimethylamino-alpha,alpha-diphenyl-valeronitrile selectively.

2. The method of separating gamma-dimethyl-amino-alpha,alpha-diphenyl-beta - methylbutyronitrile from a mixture containing it and gamma - dimethylamino - alpha,alpha - diphenyl-valeronitrile which comprises intermixing the mixture in a solvent of the type ROH, where R is selected from the group consisting of hydrogen and alkyl radicals, reacting the mixture with oxalic acid to form the binoxalates of the aminonitriles and selectively crystallizing out the gamma-dimethylamino-alpha,alpha-diphenyl - beta-methylbutyronitrile binoxalate.

3. Gamma - dimethylamino - alpha,alpha - diphenyl-valeronitrile binoxalate having a melting point of approximately 124° C. to 126° C.

4. Gamma - dimethylamino - alpha,alpha-diphenyl-beta-methylbutyronitrile binoxalate having a melting point of approximately 179° C. to 180° C.

5. The method of purifying the product of the reaction of diphenylacetonitrile with dimethyl-amino propyl chloride containing a mixture of aminonitriles and tarry impurities which comprises extracting the mixture with aqueous acid and separating the undissolved tars.

6. The method of separating the tarry impurities from a mixture of gamma-dimethyl-amino - alpha,alpha - diphenyl - beta - methylbutyronitrile and gamma-dimethylamino-alpha,-alpha-diphenyl-valeronitrile which comprises extracting the aminonitriles from the mixture with approximately equivalent quantities of acid and recovering the aminonitriles from the acid solution.

7. The method of removing tarry contaminants from a mixture of gamma-dimethylamino-alpha,alpha-diphenyl-valeronitrile and gamma-dimethylamino - alpha, alpha - diphenyl - beta-methylbutyronitrile prepared by reaction of diphenylacetonitrile with dimethylaminopropyl chloride which comprises extracting the mixture with an aqueous acid solution containing acid sufficient to combine with the aminonitriles and separating the acid phase from the undissolved tar.

8. The method of separating gamma-dimethyl-amino - alpha,alpha - diphenyl - beta - methylbutyronitrile from gamma - dimethylamino-alpha,alpha-diphenyl-valeronitrile which comprises converting a mixture of the two to a mixture of their oxalate salts in a solvent of the type ROH, where R is selected from the group consisting of hydrogen and alkyl radicals, and selectively crystallizing one salt while keeping the other in solution.

9. The method of preparing substantially pure gamma-dimethylamino-alpha,alpha - diphenyl-valeronitrile and substantially pure gamma-dimethylamino - alpha,alpha - diphenyl - beta-methylbutyronitrile which comprises dissolving a mixture containing these compounds in an aliphatic alcohol, crystallizing out gamma-dimethylamino - alpha,alpha - diphenyl - valeronitrile selectively, reacting the mixture remaining after said crystallization with oxalic acid to form the binoxalates of said nitriles, and selectively crystallizing out gamma-dimethylamino-alpha,alpha-diphenyl-beta - methylbutyronitrile binoxalate.

10. The method of preparing substantially pure gamma - dimethylamino-alpha,alpha - diphenyl-valeronitrile and substantially pure gamma-dimethylamino - alpha,alpha - diphenyl - beta-methylbutyronitrile which comprises intermixing a mixture containing said nitriles and tarry impurities with an aqueous acid, extracting said mixture with aqueous acid and separating the undissolved tars, neutralizing the extracted liquid, intermixing the extracted liquid with an aliphatic alcohol, crystallizing out gamma-dimethylamino-alpha,alpha-diphenyl - valeronitrile selectively, reacting the mother liquor resulting therefrom with oxalic acid to form the binoxalates of said aminonitriles and selectively crystallizing out the gamma-dimethylamino-alpha,alpha - diphenyl-beta-methylbutyronitrile binoxalate.

11. Method of preparing substantially pure gamma-dimethylamino-alpha,alpha - diphenyl-valeronitrile and substantially pure gamma-dimethylamino - alpha,alpha - diphenyl - beta-methylbutyronitrile from a mixture containing these nitriles and tarry impurities which comprises dissolving a mixture containing these compounds in an aliphatic alcohol, crystallizing out gamma-dimethylamino-alpha,alpha - diphenyl-valeronitrile, extracting the mother liquor remaining after said crystallization with aqueous acid to separate the undissolved tarry impurities, neutralizing the extracted liquid, reacting said extracted liquid with oxalic acid to form the binoxalates of the aminonitriles and selectively crystallizing out gamma-dimethylamino-alpha,- alpha-diphenyl-beta-methylbutyronitrile binoxalate.

12. The method of preparing substantially pure gamma-dimethylamino-alpha,alpha - diphenyl-valeronitrile and substantially pure gamma-dimethylamino-alpha,alpha-diphenyl-beta - methylbutyronitrile from a mixture containing these aminonitriles and tarry impurities which comprises extracting said mixture with approximately equivalent quantities of hydrochloric acid, separating the undissolved tarry impurities, neutralizing the extracted liquid, treating the extracted mixture with isopropyl alcohol, crystallizing out gamma-dimethylamino-alpha,alpha - diphenyl-valeronitrile selectively, reacting the mother liquor remaining after said crystallization with oxalic acid to form the binoxalates of the aminonitriles, and selectively crystallizing out the gamma-dimethylamino-alpha,alpha - diphenyl-beta-methylbutyronitrile binoxalate.

13. The method of preparing substantially pure gamma-dimethylamino-alpha,alpha - diphenyl-valeronitrile and substantially pure gamma-dimethylamino-alpha,alpha-diphenyl-beta - methylbutyronitrile which comprises dissolving a mixture containing these compounds in an inert solvent for said nitriles, crystallizating out gamma - dimethylamino - alpha,alpha - diphenyl-valeronitrile selectively, reacting the mixture remaining after said crystallization with oxalic acid to form the binoxalates of said nitriles, and selectively crystallizing out gamma - dimethyl-amino - alpha,alpha - diphenyl - beta - methylbutyronitrile binoxalate from an inert solvent for said binoxalates.

ROGER W. STOUGHTON.

REFERENCES CITED

The following references are of record in the file of this patent:

UNITED STATES PATENTS

| Number | Name | Date |
|---|---|---|
| 2,229,187 | Peyer | Jan. 21, 1941 |

OTHER REFERENCES

Gattermann, "Organic Chemistry" (MacMillan), pp. 11–14 (1896).

MacArdle, "Solvents in Synthetic Org. Chem." (Van Nostrand), pp. 12–13, 40–43 (1925).

Report No. PB981, Office of Publications Board of the Department of Commerce, pp. 96, 96A, 97 (July, 1945).

Schultz et al., J. Am. Chem. Soc., vol. 69, p. 188 (January, 1947).

Easton et al., J. Am. Chem. Soc., vol. 69, pp. 976–977 (April, 1947).

Thorp et al., Nature, vol. 159, pp. 679–680 (May 17, 1947).

Schultz et al., J. Am. Chem. Soc., vol. 69, pp. 2454–2458 (October, 1947).

Thorp et al., Nature, vol. 160, pp. 605–606 (November 1, 1947).